(12) United States Patent
Zhitao et al.

(10) Patent No.: US 7,447,309 B2
(45) Date of Patent: Nov. 4, 2008

(54) HINGE MECHANISM

(75) Inventors: Qu Zhitao, Tucheng (TW); Chihyu Chen, Tucheng (TW); Lobo Wang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 800 days.

(21) Appl. No.: 11/072,712

(22) Filed: Mar. 7, 2005

(65) Prior Publication Data

US 2006/0198512 A1    Sep. 7, 2006

(51) Int. Cl.
*H04M 1/00* (2006.01)
*H04M 9/00* (2006.01)

(52) U.S. Cl. .............................. 379/433.13; 379/433.11; 455/575.3

(58) Field of Classification Search ............. 379/433.01, 379/433.11, 433.12, 433.13; 455/550.1, 455/575.3; 220/4.22, 4.23, 830, 840, 843–845, 220/848; 16/266, 267, 262, 382
See application file for complete search history.

(56) References Cited

U.S. PATENT DOCUMENTS

| 4,407,044 | A | * | 10/1983 | Iseki ........................... 16/237 |
| 5,316,168 | A | * | 5/1994 | Finch et al. ................ 379/440 |
| 5,629,979 | A | * | 5/1997 | Domoleczny .......... 379/433.13 |
| 5,761,300 | A | * | 6/1998 | Domoleczny .......... 379/433.13 |

\* cited by examiner

*Primary Examiner*—Curtis Kuntz
*Assistant Examiner*—Phylesha L Dabney
(74) *Attorney, Agent, or Firm*—Rosenberg, Klein & Lee

(57) ABSTRACT

A hinge mechanism for rotatably coupling a flip element to a body portion of an electronic device has a pivot member provided at an end of the flip element with two shafts at the opposite ends thereof, a retaining member disposed in the body portion, and a cover. The retaining member has two abutments with a pair of first grooves defined in the bottom surfaces thereof for the shafts riding therein. First ladderlike rims are formed along edges of the retaining member. The cover has two shoulders with a pair of second grooves defined in the top surfaces thereof. Second ladderlike rims are formed along edges of the cover. The first ladderlike rims engage with the second ladderlike rims to secure the cover on the retaining member, and the first grooves and the second grooves are aligned to define shaft holes for the shafts rotating therein.

10 Claims, 7 Drawing Sheets

HINGE MECHANISM

BACKGROUND OF THE INVENTION

1. Field of the Invention

The present invention relates generally to a hinge mechanism for hinging the housings of a foldable, portable electronic device, and more especially, to a hinge mechanism with simple structures for easy assembling.

2. The Related Art

Nowadays, electronic devices that are portable, such as digital cameras, mobile phones, etc., are widely used. To facilitate portability, it is known to make an electronic device foldable so that the electronic device can be more compact when two portions of the electronic device are foldable upon themselves. Portable electronic devices that utilize this type of design usually have most or all of the electronics within the larger portion, herein after called the body portion. The smaller portion will hereinafter be called the flip element.

A variety of hinge mechanisms have been used to rotatably couple the flip element to the body portion. One such hinge mechanism, as shown in FIG. 12, has a sleeve 124 integrally formed at an end of the flip element 104. The sleeve 124 has a close end with a shaft 127 extending therefrom and an open end 122. The hinge mechanism also comprises a spring 116, a cam 118, and a follower 120 assembled into the sleeve 124 via the open end 122 thereof. A pair of shoulders is formed at an end of the body portion 102 and defines a recess 103 therebetween for the sleeve 124 riding therein. Two shaft cavities 107 are respectively defined in the shoulders. When assembling, the shaft 127 is inserted into one shaft cavity 107. Then the follower 120 projected out from the sleeve 124 is inserted into the other shaft cavity 107 by means of a special tool.

FIG. 13 discloses another hinge mechanism of the prior art including two shaft cavities 2110 in the flip element 2000 and a module 1050 assembled to the body portion. A pair of shafts 21 is disposed at opposite ends of the module 1050. When assembling, however, a special tool for inserting the shafts 21 into the shaft cavities 2110 is also required.

As described above, in the prior art, the shaft cavities for holding the shafts are both integrally molded with the flip element or the body portion, so a special tool is inevitably needed to help to insert the shafts into the shafts cavities. Therefore, the assembly of prior hinge mechanisms is both clumsy and time consuming. As the same reason, disassembling of those hinge mechanisms is also difficult, which make maintenance of the electronic devices inconvenient.

SUMMARY OF THE INVENTION

Thus, an object of the present invention is to provide a hinge mechanism whose assembly only needs a press action without the use of special tool.

Another object of the present invention is to provide a hinge mechanism with simple structure for easy assembling and disassembling.

To attain the above objects, the present invention provides a hinge mechanism for rotatably coupling a flip element to a body portion of an electronic device including a pivot member provided at an end of the flip element with a pair of shafts at opposite ends thereof, a retaining member disposed in the body portion, and a cover. Two abutments are disposed on opposite sides of the retaining member for the pivot member riding thereon. A pair of first grooves is defined in the bottom surfaces of the abutments to receive the two shafts. First ladderlike rims are formed along edges of the retaining member. A pair of shoulders is disposed on opposite sides of the rear portion of the cover, while a rear wall is extended upward from the flip element member joining the shoulders. A pair of second grooves is defined on the top surfaces of the shoulders corresponding to the first grooves. Second ladderlike rims are formed along edges of the cover. The first ladderlike rims engage with the second ladderlike rims to secure the cover on the retaining member, and the second grooves are aligned with the first grooves to define a pair of shaft holes for the shafts rotating therein.

The present invention is further to provide a hinge mechanism for rotatably coupling a flip element to a body portion of an electronic device including a pivot member provided at an end of the flip element with a pair of shafts at opposite ends thereof, a retaining member disposed in the body portion, and a cover. Two abutments are disposed on opposite sides of the retaining member for the pivot member riding thereon. A pair of first grooves is defined in the bottom surfaces of the abutments to receive the two shafts. A plurality of posts is disposed around the retaining member. A pair of shoulders is disposed on opposite sides of the rear portion of the cover, while a rear wall is extended upward from the flip element member joining the shoulders. A pair of second grooves is defined on the top surfaces of the shoulders corresponding to the first grooves. A plurality of mounting holes is defined around the cover for mating with the posts to secure the cover on the retaining member, and the second grooves are aligned with the first grooves to define a pair of shaft holes for the shafts rotating therein.

In the present invention, the shaft holes are defined through the alignment of the first grooves and the second grooves. With such structure, assembling of the hinge mechanism is performed firstly placing the shafts in the first grooves, and then pressing the cover on the retaining member to align the second grooves with the first grooves to form the shaft holes for the shafts being hold and rotating therein. So no special tool is required, thereby simplifying the assembling and disassembling.

Other objects, advantages and novel features of the present invention will become more apparent from the following detailed description when taken in conjunction with the accompanying drawings.

DETAILED DESCRIPTION OF THE PREFERRED EMBODIMENT

Figure 1:
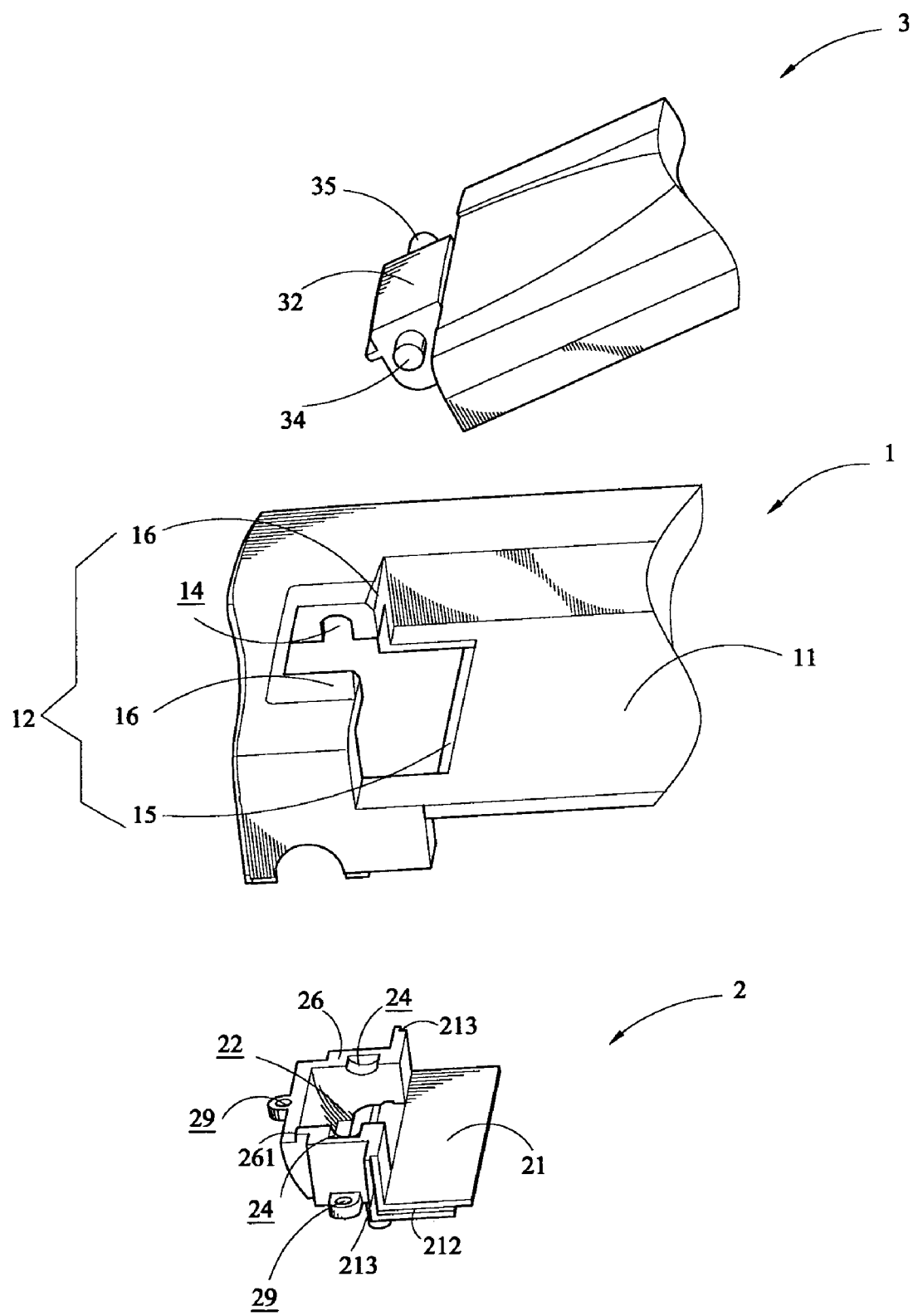
FIG. 1 is an exploded view of a foldable electronic device including a hinge mechanism according to the present invention.

Referring to FIG. 1, a hinge mechanism according to the present invention is provided to hinge a flip element 3 and a body portion 1 of an electronic device. The hinge mechanism comprises a pivot member 32 provided at an end of the flip element 3 with a pair of shafts 34, 35 at opposite ends thereof, a retaining member 12 disposed in the body portion 1, and a cover 2 for engaging with the retaining member 12.

Figure 2:
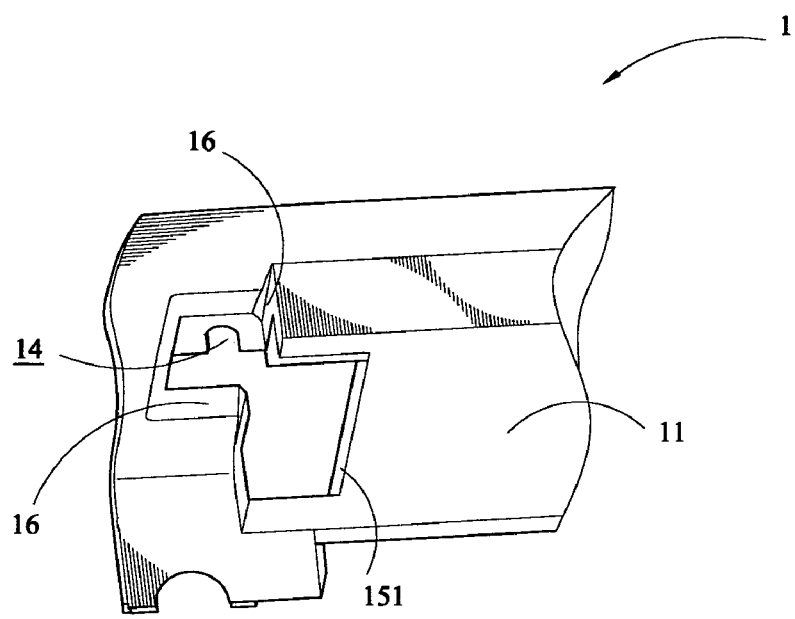
FIG. 2 is a perspective view of the body portion as shown in FIG. 1.
Figure 3:
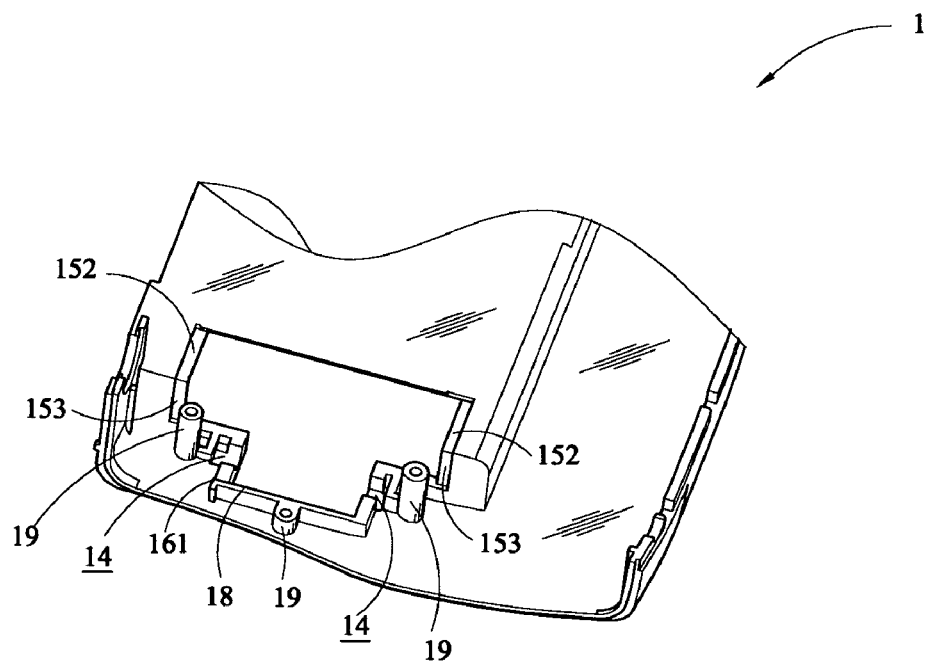
FIG. 3 is another perspective view of the body portion as shown in FIG. 1.

Referring to FIGS. 1, 2 and 3, the retaining member 12 has a pair of abutments 16 disposed on opposite sides thereof and first ladderlike rims 15 formed along edges thereof. Detailed structure of the first ladderlike rims 15 that comprises a front first ladderlike rim 151, two lateral first ladderlike rims 152, two vertical first ladderlike rims 153 and a rear first ladderlike rim 161 will be further described below. The two abutments 16 are taller than a base 11 of the body portion 1 and protruded upward there-from. A pair of first grooves 14 is defined in the bottom surfaces of the abutments 12. The shapes of the first grooves 14 are adapted to the shapes of the shafts of the pivot member 32. According to the present preferred embodiment, one of the first grooves 14 is semicircular, and the other is semielliptical. The bottom surface of the front edge of the retaining member 12 extends rearward to form the front first ladderlike rim 151 being lower to the top surface of the base 11. The bottom surface of the front first ladderlike rim 151 is flush with the bottom surface of the base 11. That is to say, the front first ladderlike rim 151 is thinner than the base 11, thereby shaping like a ladder. Two lateral edges of the retaining member 12 extend inward to form the lateral first ladderlike rims 152 that are higher to the bottom surface of the base 11. The top surfaces of the lateral first ladderlike rims 152 are flush with the top surface of the base 11. In other words, the thickness of the lateral first ladderlike rims 152 is thinner than the thickness of the base 11. So the lateral ladderlike rims 152 are also shaped like ladders. The front ends of the two lateral first ladderlike rims 152 are respectively stacked above the opposite ends of the front first ladderlike rim 151. The height of the stacked portion of the lateral first ladderlike rim 152 and the front first ladderlike rim 151 is equal to the height of the base 11. The two abutments 16 protrude upward from the body portion 1 and form two first vertical walls at the front of the abutments 16. The two first vertical walls extend inward to form the vertical first ladderlike rims 153 respectively. A retaining wall 18 is disposed at the rear portions of the two abutments 16 for connecting the rear portions of the two abutments 16. The rear first ladderlike rim 161 is disposed on one bottom surface of the two abutments 16 being lower than the bottom surface of the adjacent retaining wall 18. That is to say, there is a height between the bottom surface of the abutments 16 and the bottom surface of the retaining wall 18, which shapes like a ladder.

Figure 4:
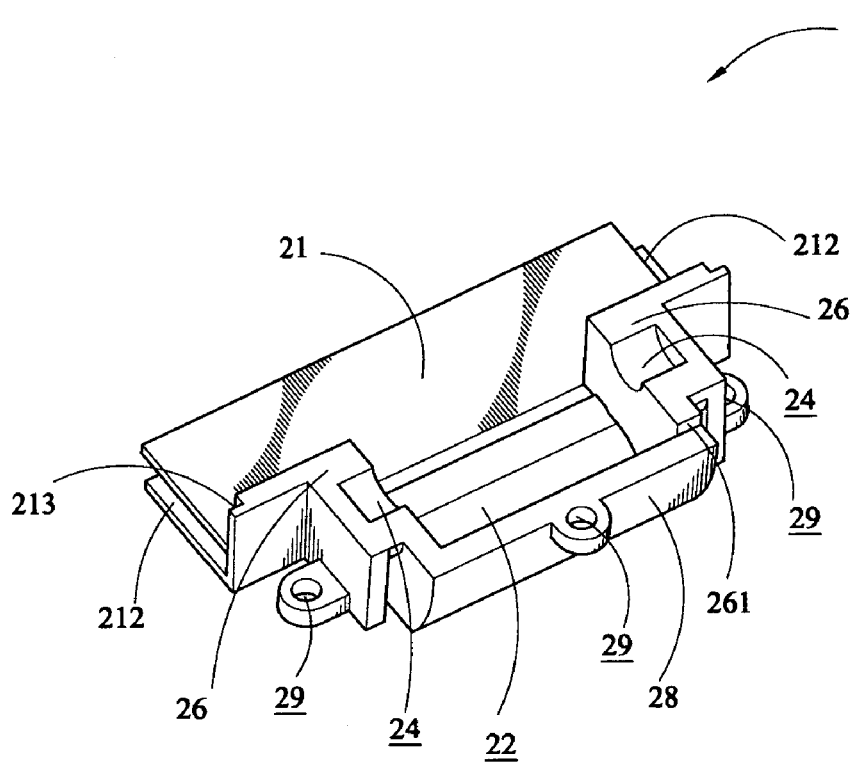
FIG. 4 is a perspective view of the cover as shown in FIG. 1.
Figure 5:
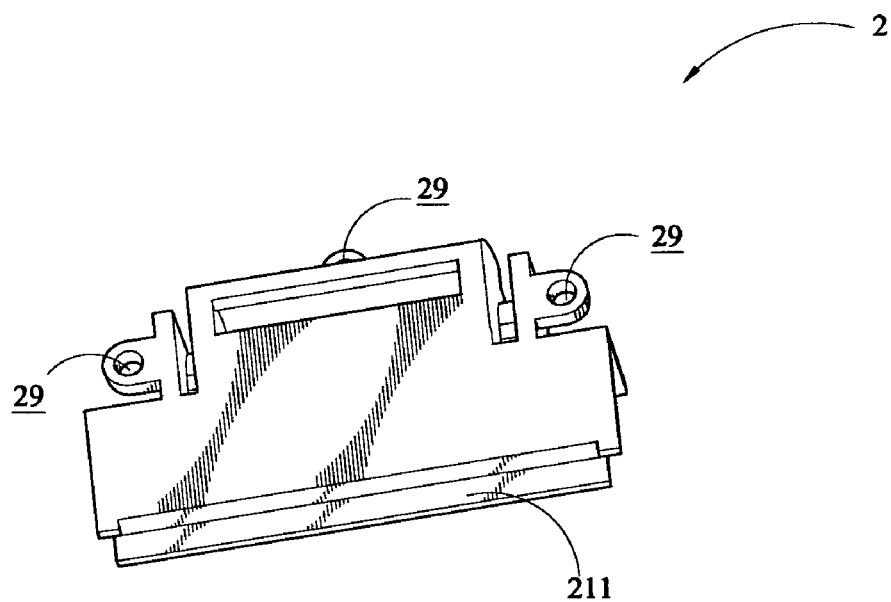
FIG. 5 is another perspective view of the cover as shown in FIG. 1.

Referring to FIGS. 4 and 5, the front portion of the cover 2 is a flat baseboard 21. Two shoulders 26 are disposed at opposite sides of the rear portion of the cover 2. A rear wall 28 is extended from the rear edge of the cover 2 joining the two shoulders 26. The inner sides of the two shoulders 26 and the rear wall 28 define a pivot recess 22 for holing the pivot member 3. The two shoulders 26 are vertically protruded from the rear portion of the flat baseboard 21 to form two front second vertical walls at the front of the shoulder 26. A pair of second grooves 24 is defined in the top surfaces of the shoulders 26 corresponding to the first grooves 14 of the abutments 16. The shapes of the second grooves 24 are adapted to the shapes of the shafts, for example, semicircular, semielliptical etc. In the present preferred embodiment, corresponding to the shapes of the first grooves 14, one of second grooves 14 is semicircular, and the other is semielliptical. The front edge of the flat baseboard 21 extends forward to form a front second ladderlike rim 211. The top surface of the front second ladderlike rim 211 is flush with the top surface of the flat baseboard 21. There is a height between the bottom surface of the front second ladderlike rim 211 and the bottom surface of the flat baseboard 21, which shapes like a ladder. The height of the front second ladderlike rim 211 is equal to the height of the lateral first ladderlike rim 122. The two sides of the flat baseboard 12 extend outwardly to form two lateral second ladderlike rims 212. The bottom surface of each lateral ladderlike rim 212 is flush with the bottom surface of the flat baseboard 12, and the top surface of each lateral second ladderlike rim 212 is lower than the top surface of the flat baseboard 12, which shapes like a ladder. The height of each lateral second ladderlike rim 212 is equal to the height of the front first ladderlike rim 121. Corresponding to the vertical first ladderlike rim 123 aforementioned, the two front second vertical front walls are extended outward to form two vertical second ladderlike rims 213. One top surface of the shoulders 26 is higher than the adjacent top surface of the rear wall 28 to form a rear second ladderlike rim 261, and the height of the rear second ladderlike rim 261 is equal to the height of the rear first ladderlike rim 161.

Figure 6:
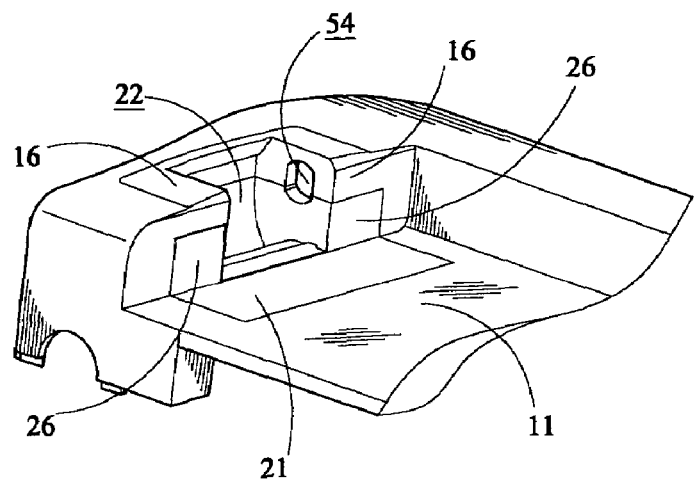
FIG. 6 is a perspective view showing the cover being assembled to the body portion.
Figure 7:
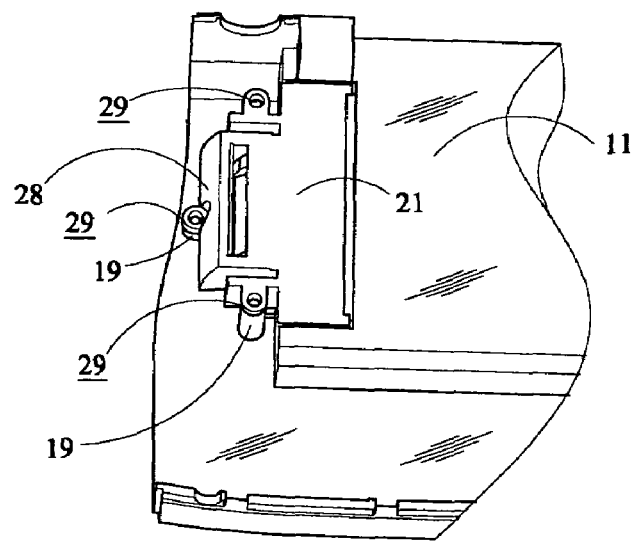
FIG. 7 is another perspective view showing the cover being assembled to the body portion.

Referring to FIGS. 6 and 7, when assembling the cover 2 with the retaining member 12, the front second ladderlike rim 211 engages with the front first ladderlike rim 121, and the two lateral second ladderlike rims 212 engage with the two lateral first ladderlike rims 122. Then, by pressing the rear wall 28 of the cover 2, the vertical first ladderlike rim 123 engages with the vertical second ladderlike rim 213, and the rear second ladderlike rim 261 engages with the rear first ladderlike rim 161, and triggers a click at the same time. So the cover 2 is stably secured on the retaining member 12 of the body portion 1. The top surface of the flat baseboard 21 is flush with the top surface of the base 11 of the body portion 1, and the pivot recess 22 exposes outward to receive the pivot member 2. The first grooves 14 are aligned with the second grooves 24 to define a pair of shaft holes 54. The shapes of the shaft holes 54 are determined by the shapes of the first and the second grooves 14, 24, for example, a circular, a elliptical etc. In the present preferred embodiment, according to the shapes of the first and the second grooves 14. 24 aforementioned, one of the shaft holes 54 is circular, while the other is elliptical. As described above, it does not need an assembly tool to assembly the cover 2 to the retaining member 12. Since the assembling work just needs a press-push manipulation with a hand, the assembling work is simplified.

Figure 8:
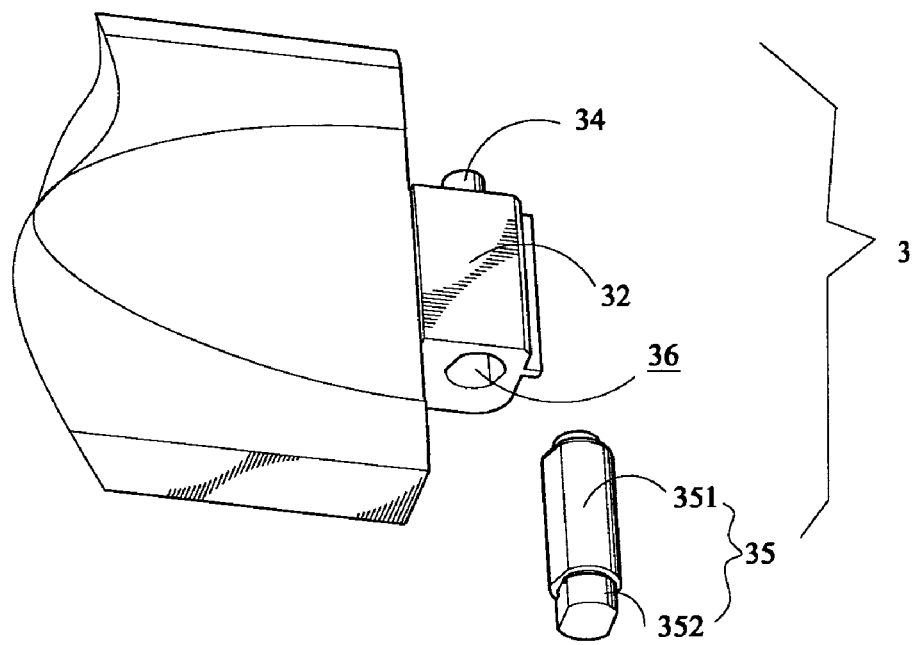
FIG. 8 is an exploded view of the flip element as shown in FIG. 1.
Figure 9:
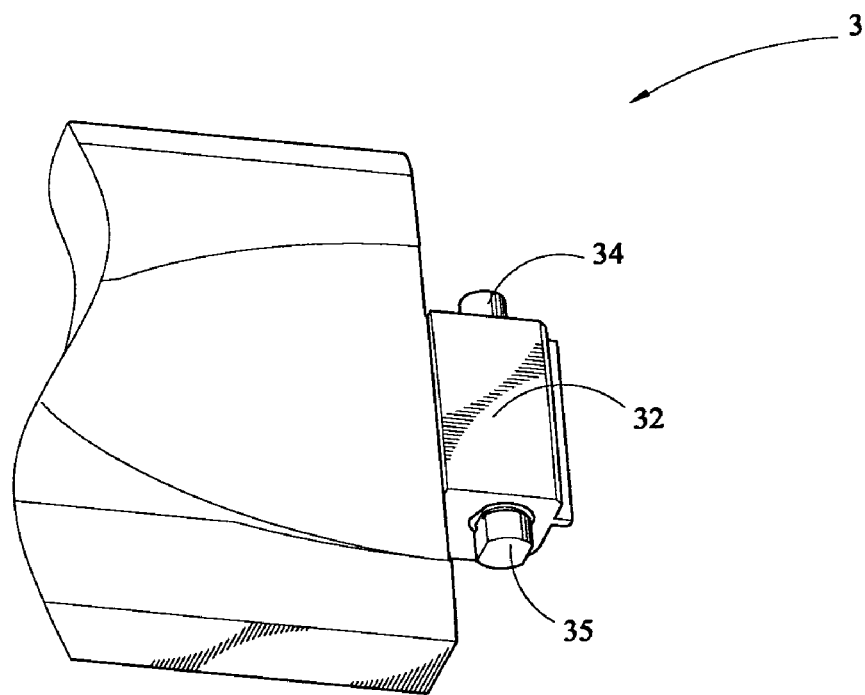
FIG. 9 is another perspective view of the flip element as shown in FIG.1.

Now referring to FIG. 8, shafts 34, 35 are respectively disposed at the laterals of the pivot member 32. The general construction and operation of a pivot member 32 are well known by the skilled in the field and the detail will not be further described herein. In the present preferred embodiment, the cylinder fixed shaft 34 is integrally formed with one lateral end of the pivot member 32, and an ellipse shape hole 36 is defined in the other end of the pivot member 32. The elliptical self-positioned shaft 35 of a prior art is received in the ellipse shape hole 36, as shown in FIG. 9. The self-positioned shaft 35 being well known by the skilled in the field comprises an elliptical receiving portion 352 and an elliptical rotating portion 351 rotating around the receiving portion 352 for automatic positioning. According to the present invention, the shapes of the shafts 34, 35 are adapted to the shapes of the shaft holes 54 defined by the first and second grooves 14, 24. In the present preferred embodiment, the shape of the fixed shaft 34 is circular, and the shape of self-positioned shaft 35 is elliptical.

Figure 10:
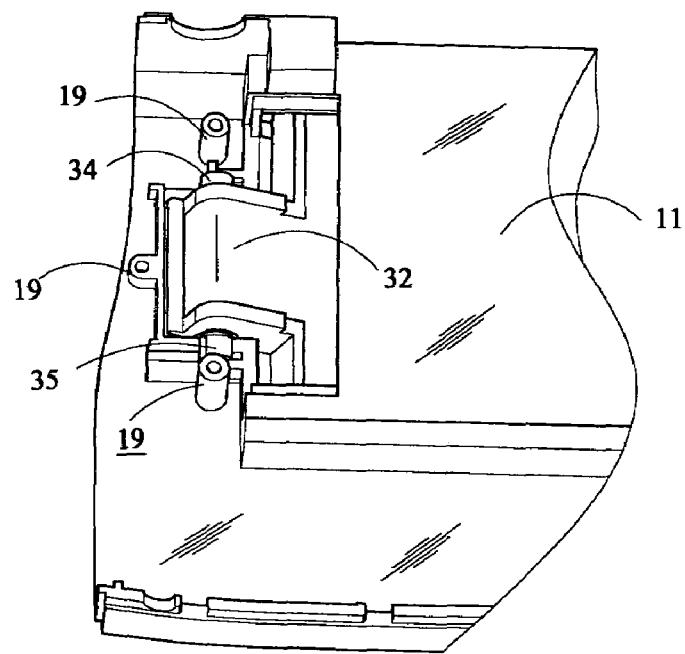
FIG. 10 is a perspective view showing the flip element being assembled to the body portion.
Figure 11:
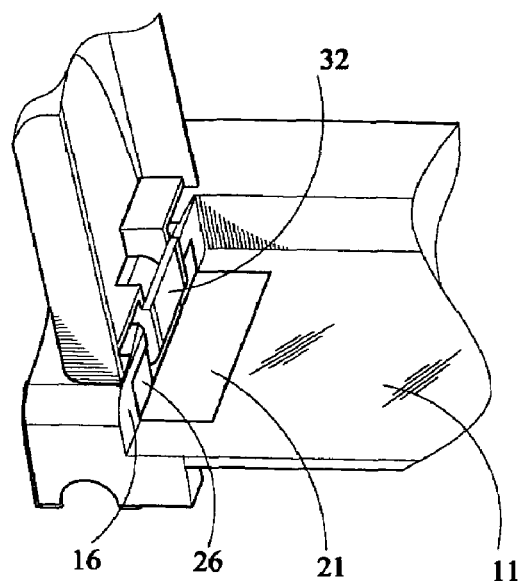
FIG. 11 is a perspective view showing the hinge mechanism rotatably coupling the flip element to the body portion.
Figure 12:
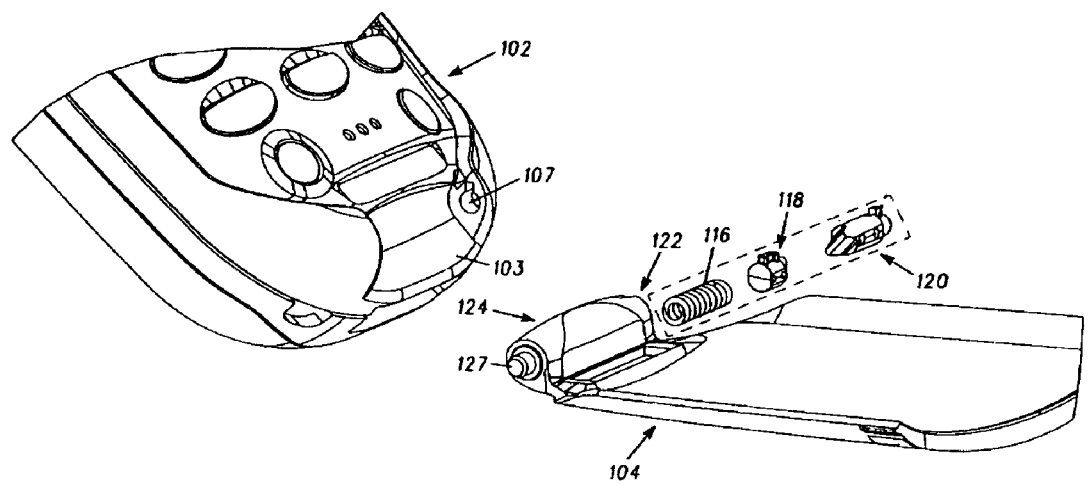
FIG. 12 is a perspective view of a hinge mechanism according to a prior art.
Figure 13:
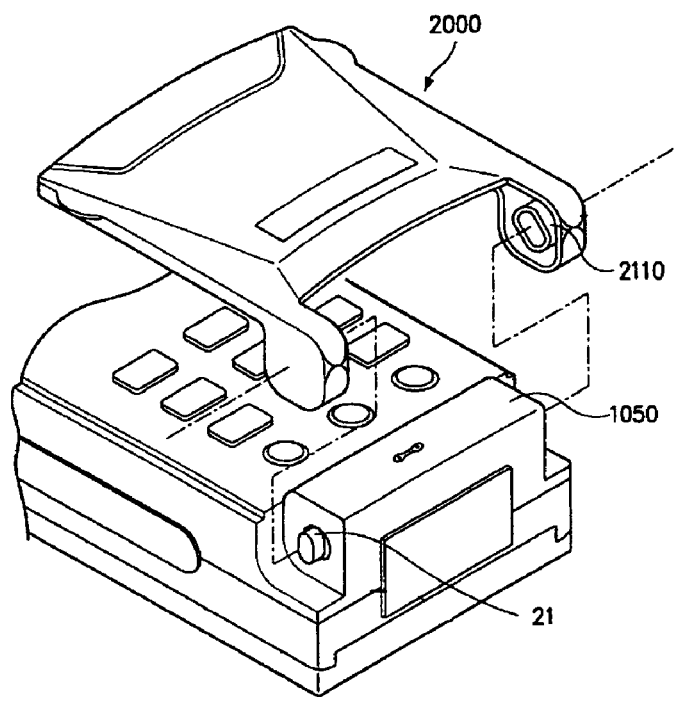
FIG. 13 is a perspective view of a hinge mechanism according to another prior art.

Referring to FIGS. 10 and 11, the self-positioned shaft 35 is installed in the elliptical hole 36 with the receiving portion 352 protruding outside. Then the shafts 34, 35 are placed in the first grooves 14. Thereafter, the cover 2 is secured to the retaining member 12 of the body portion 1 in the aforementioned way. Therefore, the pivot member 32 is positioned in the pivot recess 22, while the shafts 34, 35 of the pivot member 2 are held in the shaft holes 54. When opening the flip element 3, the pivot member 32 is rotated in the pivot recess 22 with the shafts 34, 35 being rotated in the shaft holes 54, and the pivot member 32 is automatically positioned through the self-positioned shaft 35 thereof.

Again with reference to FIGS. 3, 5 and 7, instead of the first ladderlike rims 15 and the second ladderlike rims, a plurality of posts 19 is disposed around the retaining member 12 of the body portion 1, correspondingly, a plurality of protrusions are protruded outward from the lateral sides of the cover 2. Each protrusion defines a mounting hole 29 for mating with the corresponding posts 19. When the pivot member 32 is assembled with the retaining member 12 of the body portion 1, the cover 2 is secure on the retaining member 12 with the engagement of the posts 19 and the corresponding mounting holes 29. Besides that, the hinge mechanism can be further securely assembled through other well-known securing mechanisms, for example, a threaded cave can be defined in each posts 19, and correspondingly, the mounting holes 29 can be threaded to be threaded holes, so the threaded caves are aligned with corresponding threaded holes to be threaded cavities, then screws can be threaded into the threaded cavities for securing the cover 2 on the retaining member 12. More and other lock mechanisms can be used to achieve the object of securing the cover 2 to the body portion 1 by skilled in the field and will not be further described herein. According to the present invention, the cover 2 is fixed to the body portion 1 stably through the engagement between the first ladderlike rim and the second ladderlike rim. In another way, the engagement of the posts 19 and the mounting holes 29 are also achieved to secure the cover 2 on the body portion 1. The aforementioned two securing ways can be alternatively applied to the hinge mechanism, or both the two ways can be applied to the hinge mechanism for strengthen the engagement of the hinge mechanism.

As described above, in the present invention, the shaft holes 54 for holding the shafts 34, 35 are defined through the alignment of the first grooves 14 and the second grooves 24. The assembly of the hinge mechanism is simplified with just a press-push manipulation by hand without a assembling tool. Furthermore, it is convenient to disassemble the cover 2 from the body portion 1 for the simple structure of the hinge mechanism described above. It facilitates maintaining the electronic device and reducing the cost for simple structure of the hinge mechanism.

Many variations and modifications may be made to the embodiment of the invention without departing substantially from the spirit and principles of the invention. All such modifications and variations are intended to be included herein within the scope of the present invention.

What is claimed is:

1. A hinge mechanism for rotatably coupling a flip element to a body portion of an electronic device, comprising:
    a pivot member provided at an end of the flip element with a pair of shafts at opposite ends thereof;
    a retaining member disposed in the body portion, the retaining member having a pair of abutments on opposite sides thereof for the pivot member riding thereon, a pair of first grooves being defined in the bottom surfaces of the abutments to receive the shafts, first ladderlike rims being formed along edges of the retaining member; and
    a cover having a pair of shoulders on opposite sides thereof and a rear wall joining the shoulders, a pair of second grooves being defined in the top surfaces of the shoulders, second ladderlike rims being formed along edges of the cover, the first and the second ladderlike rims being engaged to secure the cover on the retaining member and the first and the second grooves being aligned to define shaft holes for the shafts rotating therein.

2. The hinge mechanism as claimed in claim 1, wherein one of said first grooves and the corresponding one of said second grooves are semicircular, and the other one of said first grooves and the corresponding one of said second grooves are semielliptical.

3. The hinge mechanism as claimed in claim 1, wherein said shafts are integrally formed at opposite ends of the pivot member.

4. The hinge mechanism as claimed in claim 1, wherein one of said shafts is a self-positioned shaft.

5. The hinge mechanism as claimed in claim 1, wherein said first ladderlike rims comprise a front first ladderlike rim, two lateral first ladderlike rims, a vertical first ladderlike rim and a rear first ladderlike rim, and said second ladderlike rims comprise a front second ladderlike rim, two lateral second ladderlike rims, a vertical second ladderlike rim and a rear second ladderlike rim.

6. The hinge mechanism as claimed in claim 1, wherein the body portion forms a plurality of posts around the retaining member, a plurality of mounting holes are defined around the cover for mating with the posts.

7. A hinge mechanism for rotatably coupling a flip element to a body portion of an electronic device, comprising:
    a pivot member provided at an end of the flip element with a pair of shafts at opposite ends thereof;
    a retaining member disposed in the body portion, the retaining member having a pair of abutments on opposite sides thereof for the pivot member riding thereon, a pair of first grooves being defined in the bottom surfaces of the abutments to receive the shafts, a plurality of posts being disposed around the retaining member; and
    a cover having a pair of shoulders on opposite sides thereof and a rear wall joining the shoulders, a pair of second grooves being defined in the top surfaces of the shoulders, a plurality of mounting holes being defined around the cover for mating with the posts to secure the cover on the retaining member, the first and the second grooves being aligned to define shaft holes for the shafts rotating therein.

8. The hinge mechanism as claimed in claim 7, wherein one of said first grooves and the corresponding one of said second grooves are semicircular, and the other one of said first grooves and the corresponding one of said second grooves are semielliptical.

9. The hinge mechanism as claimed in claim 7, wherein said shafts are integrally formed at opposite ends of the pivot member.

10. The hinge mechanism as claimed in claim 7, wherein one of said shafts is a self-positioned shaft.

* * * * *